Patented May 8, 1934

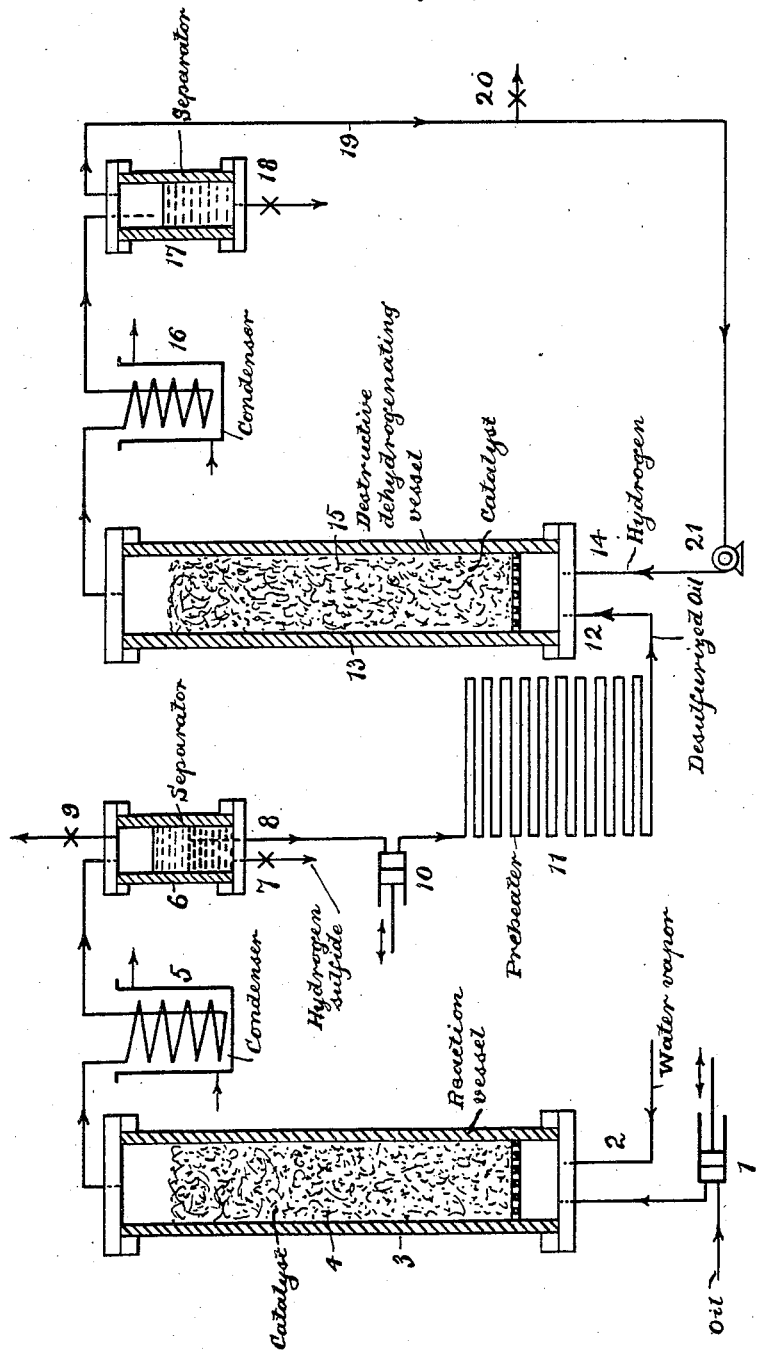

1,957,787

UNITED STATES PATENT OFFICE 1,957,787

PRODUCTION OF VALUABLE LIQUID PRODUCTS FROM CARBONACEOUS MATERIALS

Carl Krauch, Ludwigshafen-on-the-Rhine, Mathias Pier, Heidelberg, and Karl Winkler, Ludwigshafen-on-the-Rhine, Germany, assignors to Standard-I. G. Company, Linden, N. J., a corporation of Delaware Application July 29, 1931, Serial No. 553,760
In Germany September 2, 1925

14 Claims. (Cl. 196—53)

This application is a continuation-in-part of the application for Letters Patent Ser. No. 131,126, filed August 23, 1926 which relates to a process for the production of valuable liquid hydrocarbon products from carbonaceous materials containing sulphur by first purifying these materials by treatment with water or water vapor at an elevated pressure and at a temperature higher than that at which decomposition of the materials sets in.

It is the employment of specific features of that process, in particular the specific pressures preferably employed in this treatment, to which the present invention is directed.

We have found that crude liquid carbonaceous materials are converted in a particularly advantageous manner into valuable liquid hydrocarbon products, free from or substantially free from sulphur and other impurities by acting on the initial material, which is preferably in a state of flow whilst under treatment, with water or water vapor, with or without an addition of hydrogen, under an elevated pressure of at least 10 atmospheres and at temperatures higher than that at which decomposition of the materials sets in, preferably in the presence of catalysts. The impurities particularly coming into question are organic compounds of sulphur, nitrogen or oxygen. In this treatment the compounds of sulphur, nitrogen or oxygen are converted into hydrogen compounds. Thus the sulphur of the sulphur compounds is converted into hydrogen sulphide, which dissolves in the water under the high pressure when the mass is cooled. The nitrogen is converted into ammonia and the oxygen into water and these conversion products are also taken up by the water. The organic radicles split off are mainly converted into hydrocarbons. The water and the gas dissolved therein, are then separated from the desulphurized material which is then subjected to destructive hydrogenation by treatment with hydrogen or gases containing or giving rise to hydrogen at elevated temperatures, under elevated pressure and in the presence of catalysts, if so desired. By destructive hydrogenation we understand the general process described and claimed in the Australian Patent No. 1217/26.

The process according to the present invention has the great advantage that the products resulting from the destructive hydrogenation are always completely free from sulphur. Furthermore the treatment with vapor brings the initial materials into a state in which they are more easily amenable to destructive hydrogenation.

Although the minimum pressure in the first stage of the new process is 10 atmospheres, where pressure-resistant apparatus is available it will be advantageous to operate under pressures of the order of 20, 40, 50, 100, 200 atmospheres or even more, the reaction being greatly accelerated by the employment of high pressures. As examples of the crude carbonaceous initial materials to be treated may be mentioned coal of all varieties, tars, mineral oils, products of distillation or extraction of said carbonaceous materials or residues from the said processes.

The process is of particular advantage for the treatment of initial carbonaceous materials rich in sulphur, since by the ordinary methods of destructive hydrogenation, the said large amounts of sulphur can sometimes only be removed with difficulty, and are liable to be found again in the final products, whereby their value is considerably diminished. According to the present invention final products entirely free from sulphur are obtained.

The quantity of water to be added in the first stage of the process depends on the quantity of sulphur contained in the initial material, on the quantity of water already contained therein and on the quantity of water formed in the said treatment, for example by a reduction of oxygen-containing compounds. The temperature to be employed in the first stage of the process depends on the nature of the sulphur compounds contained in the initial material and on the kind of the catalyst, if such be employed. Among others, the metals of the sixth, seventh and eighth group of the periodic system or their compounds, alone or in mixture with one another, are very suitable for use as catalysts for the desulphurization.

In the case of initial materials rich in sulphur it may be advantageous to subject the initial materials to a preliminary desulphurization in the well known manner, for example by a treatment with iron, copper or their oxids or the like. However, a sufficiently complete desulphurization takes place only in the treatment with water as described above.

How the invention may be carried out in practice will be further illustrated with reference to the accompanying drawing, which shows diagrammatically partly in elevation and partly in section an apparatus suitable for carrying out the process according to the present invention. It should be understood that the invention is not limited to the specific example given nor to operations carried out in the apparatus specifically illustrated.

Referring to the drawing, crude mineral oil containing 3.8 per cent of sulphur is partly desulphurized by treatment with iron and copper in known manner in an apparatus not shown in the drawing, a product containing between about 1 and 1.4 per cent of sulphur being thus obtained. This oil is then introduced by means of the booster pump 1 into the reaction vessel 3 in which a catalyst containing iron and manganese is rigidly arranged. The said catalyst is denominated in the drawing with the numeral 4. Water vapor is introduced through the pipe 2 under a pressure of about 200 atmospheres. If desired, hydrogen may be admixed with the said water vapor. A temperature of between about 500° and 550° C. is maintained in the reaction vessel, and practically all the sulphur is converted into hydrogen sulphide. The products issuing from the said reaction vessel are passed through the condenser 5 into the separating vessel 6. The aqueous layer containing the hydrogen sulphide is drawn off continuously or periodically through the pipe 6. Any gaseous products formed may be drawn off through the pipe 9. The purified oil which contains only between about 0.05 and 0.01 per cent of sulphur is drawn off through the pipe 8, and pumped by means of the booster 10 through the preheating coil 11 in which it is heated to a temperature af about 500° C. The oil passes from the said coil at 12 into the high pressure destructive hydrogenation vessel 13 in which a catalyst containing molybdenum is rigidly arranged. Hydrogen is introduced into the said vessel at 14 by means of the circulating pump 21. The reaction products are passed from the reaction vessel through the condenser 16 to the separating vessel 17. The reaction products which consist to the extent of between about 60 and 80 per cent of benzine are drawn off through the pipe 18. The gases are removed through the pipe 19 and may be recycled by means of the circulating pump 21 or a part thereof may be withdrawn at 20. Fresh gases may also be introduced at 20 when required. The catalyst contained in the reaction vessel 13 is denoted by the numeral 15.

What we claim is:

1. The process of destructively hydrogenating a liquid carbonaceous material containing sulphur, which comprises acting on the said material with sufficient water vapor to desulphurize the same under a pressure of at least 10 atmospheres and at a temperature higher than that at which decomposition of the carbonaceous material sets in for a sufficient length of time to desulphurize the initial material and place it in suitable condition for destructive hydrogenation, cooling, separating water and hydrogen sulphide from the material and exposing the purified material to destructive hydrogenation under an elevated pressure.

2. The process of destructively hydrogenating a liquid carbonaceous material containing sulphur, which comprises acting on the said material with sufficient water vapor to desulphurize the same and hydrogen under a pressure of at least 10 atmospheres and at a temperature higher than that at which decomposition of the carbonaceous material sets in for a sufficient length of time to desulphurize the initial material and place it in suitable condition for destructive hydrogenation, cooling, separating water and hydrogen sulphide from the material and exposing the purified material to destructive hydrogenation under an elevated pressure.

3. The process of destructively hydrogenating a liquid carbonaceous material containing sulphur, which comprises acting on the said material with sufficient water vapor to desulphurize the same in the presence of a catalyst under a pressure of at least 10 atmospheres and at a temperature higher than that at which decomposition of the carbonaceous material sets in for a sufficient length of time to desulphurize the initial material and place it in suitable condition for destructive hydrogenation, cooling, separating water and hydrogen sulphide from the purified material and exposing the material to destructive hydrogenation under an elevated pressure.

4. The process of destructively hydrogenating a liquid carbonaceous material containing sulphur, which comprises removing the bulk of the sulphur from the said material, subsequently acting on the said material with sufficient water vapor to desulphurize the same under a pressure of at least 10 atmospheres and at a temperature higher than that at which decomposition of the carbonaceous material sets in for a sufficient length of time to desulphurize the initial material and place it in suitable condition for destructive hydrogenation, cooling, separating water and hydrogen sulphide from the material and exposing the purified material to destructive hydrogenation under an elevated pressure.

5. The process of destructively hydrogenating a liquid carbonaceous material containing sulphur, which comprises removing the bulk of the sulphur from the said material by treatment with iron and copper at elevated temperatures, subsequently acting on the said material with sufficient water vapor to desulphurize the same under a pressure of at least 10 atmospheres and at a temperature higher than that at which decomposition of the carbonaceous material sets in for a sufficient length of time to desulphurize the initial material and place it in suitable condition for destructive hydrogenation, cooling, separating water and hydrogen sulphide from the material and exposing the material to destructive hydrogenation under an elevated pressure.

6. The process of destructively hydrogenating a liquid carbonaceous material containing sulphur, which comprises acting on said material in a state of flow with sufficient water vapor to desulphurize the same under a pressure of at least 10 atmospheres and at a temperature higher than that at which decomposition of the carbonaceous material sets in for a sufficient length of time to desulphurize the initial material and place it in suitable condition for destructive hydrogenation, cooling, separating water and hydrogen sulphide from the purified material and exposing the material to destructive hydrogenation under an elevated pressure.

7. The process of destructively hydrogenating a liquid carbonaceous material containing sulphur, which comprises acting on said material with sufficient water vapor to desulphurize the same under a pressure of at least 20 atmospheres and at a temperature higher than that at which decomposition of the carbonaceous material sets in for a sufficient length of time to desulphurize the initial material and place it in suitable condition for destructive hydrogenation, cooling, separating water and hydrogen sulphide from the material and exposing the purified material to destructive hydrogenation under an elevated pressure.

8. The process of destructively hydrogenating a liquid carbonaceous material containing sulphur, which comprises treating said material to desulphurize the same without substantial destructive hydrogenation by passing said material together with added water vapor under a pressure of about 200 atmospheres through a zone in which a temperature higher than that at which decomposition of the carbonaceous material sets in is maintained, condensing the water by cooling, separating the water with the hydrogen sulphide contained therein from said carbonaceous material, and exposing the desulphurized material to destructive hydrogenation under an elevated pressure.

9. The process of destructively hydrogenating a liquid carbonaceous material containing sulphur, which comprises treating the said material to desulphurize the same without substantial destructive hydrogenation, by subjecting said material together with added water vapor in a state of flow to a pressure of about 200 atmospheres and a temperature higher than that at which decomposition of the carbonaceous material sets in, condensing the water by cooling, separating the water with the hydrogen sulphide contained therein from said carbonaceous material, and exposing the desulphurized material to destructive hydrogenation under an elevated pressure.

10. The process of destructively hydrogenating a liquid carbonaceous material containing sulphur, which comprises treating said material to desulphurize the same without substantial destructive hydrogenation, by passing said material together with added water vapor and hydrogen under a pressure of about 200 atmospheres through a zone in which a temperature higher than that at which decomposition of the carbonaceous material sets in is maintained, condensing the water by cooling, separating the water with the hydrogen sulphide contained therein from said carbonaceous material and exposing the desulphurized material to destructive hydrogenation under an elevated pressure.

11. The process of destructively hydrogenating a liquid carbonaceous material containing sulphur, which comprises treating said material to desulphurize the same without substantial destructive hydrogenation by passing said material together with added water vapor under a pressure of about 200 atmospheres and at a temperature higher than that at which decomposition of the carbonaceous material sets in into contact with a desulphurizing catalyst, condensing the water by cooling, separating the water with the hydrogen sulphide contained therein from said carbonaceous material, and exposing the desulphurized material to destructive hydrogenation under an elevated pressure.

12. The process of destructively hydrogenating a liquid carbonaceous material containing sulphur, which comprises initially removing the bulk of the sulphur from said material, then treating said material to complete desulphurization without substantial destructive hydrogenation by passing the material together with added water vapor under a pressure of about 200 atmospheres through a zone in which a temperature higher than that at which decomposition of the carbonaceous materials sets in is maintained, condensing the water by cooling, separating the water with the hydrogen sulphide contained therein from said carbonaceous material and exposing the desulphurized material to destructive hydrogenation under an elevated pressure.

13. The process of destructively hydrogenating a liquid carbonaceous material containing sulphur, which comprises treating the said material to desulphurize the same without substantial destructive hydrogenation, by subjecting said material together with added water vapor in a state of flow to a pressure of the order of about 200 atmospheres and a temperature of between about 500° and 550° C., condensing the water by cooling, separating the water with the hydrogen sulphide contained therein from said carbonaceous material and exposing the desulphurized material to destructive hydrogenation under an elevated pressure.

14. The process of destructively hydrogenating a mineral oil containing sulphur, which comprises partially desulphurizing said oil by treating it with iron and copper, then treating said oil to complete desulphurization without substantial destructive hydrogenation by passing the oil thus treated together with water vapor under a pressure of about 200 atmospheres at between about 500° and 550° C. over a catalyst comprising iron and manganese, condensing the water vapor by cooling, separating the condensed water with the hydrogen sulphide contained therein from the oil, and destructively hydrogenating the desulphurized oil by passing it together with hydrogen under a pressure of about 200 atmospheres over a catalyst comprising molybdenum.

CARL KRAUCH.
MATHIAS PIER.
KARL WINKLER.

CERTIFICATE OF CORRECTION.

Patent No. 1,957,787. May 8, 1934.

CARL KRAUCH, ET AL.

It is hereby certified that error appears in the printed specification of the above numbered patent requiring correction as follows: Page 2, lines 87-88, and 134, claims 3 and 6 respectively, strike out the word "purified"; and lines 88, 121, and 135, claims 3, 5 and 6 respectively, after "exposing the" insert the word purified; and that the said Letters Patent should be read with these corrections therein that the same may conform to the record of the case in the Patent Office.

Signed and sealed this 16th day of October, A. D. 1934.

Leslie Frazer (Seal) Acting Commissioner of Patents.